United States Patent
Burchart et al.

(12) 
(10) Patent No.: US 6,694,058 B1
(45) Date of Patent: Feb. 17, 2004

(54) METHOD FOR MONITORING THE EXPLOITATION PROCESS OF AN APPARATUS AND SELF-SERVICE DEVICE MONITORED ACCORDING TO SAID METHOD

(75) Inventors: Joachim Burchart, Schlangen (DE); Udo Tewes, Bad Oeynhausen (DE); Hans Günter Voss, Paderborn (DE)

(73) Assignee: Wincor Nixdorf GmbH & Co. KG, Paderborn (DE)

(*) Notice: Subject to any disclaimer, the term of this patent is extended or adjusted under 35 U.S.C. 154(b) by 0 days.

(21) Appl. No.: 09/622,193

(22) PCT Filed: Jan. 22, 1999

(86) PCT No.: PCT/DE99/00157
§ 371 (c)(1), (2), (4) Date: Aug. 11, 2000

(87) PCT Pub. No.: WO99/41713
PCT Pub. Date: Aug. 19, 1999

(30) Foreign Application Priority Data

Feb. 13, 1998 (DE) .......................................... 198 06 024

(51) Int. Cl.⁷ ................................................. G06K 9/62
(52) U.S. Cl. ...................... 382/209; 382/115; 382/218; 345/863; 705/43
(58) Field of Search ......................... 382/103, 115–116, 382/209, 217–219; 235/379; 340/426.2; 345/863; 348/150, 156, 161; 705/35, 43, 44; 902/4, 8, 25

(56) References Cited

U.S. PATENT DOCUMENTS

| | | | |
|---|---|---|---|
| 5,073,950 A | 12/1991 | Colbert et al. | ............... 382/115 |
| 5,528,263 A | 6/1996 | Platzker et al. | ............. 345/156 |
| 5,594,806 A | 1/1997 | Colbert | ........................ 382/115 |
| 5,699,441 A * | 12/1997 | Sagawa et al. | ............. 382/100 |
| 6,002,808 A * | 12/1999 | Freeman | ...................... 382/288 |
| 6,037,882 A * | 3/2000 | Levy | ............................ 341/20 |
| 6,252,598 B1 * | 6/2001 | Segen | ......................... 345/863 |

FOREIGN PATENT DOCUMENTS

| | | |
|---|---|---|
| DE | 196 12 949 C1 | 8/1997 |
| EP | 0 622 722 A2 | 11/1994 |

OTHER PUBLICATIONS

"Der virtuelle Computer" Tr Technische Rundschau, Nr. 3, 1997, p. 6 "Visual Interpretation of Hand Gestures for Human–Computer Interaction: A Review", Vladimir I. Pavlovic et al., IEEE Transactions on Pattern Analysis and Machine Intelligence, vol. 19, No. 7, Jul. 1997, pp. 678–695.

* cited by examiner

Primary Examiner—Daniel Mariam
(74) Attorney, Agent, or Firm—McCormick, Paulding & Huber LLP

(57) ABSTRACT

The invention relates to a method for monitoring an equipment operation procedure and to a self-service device monitored using this method. An optical pattern recognition method is used to detect the hand posture which is characteristic of an equipment operation procedure alone or else together with an object to be handled when using equipment, and to compare said hand posture with a prescribed pattern.

3 Claims, 2 Drawing Sheets

US 6,694,058 B1

METHOD FOR MONITORING THE EXPLOITATION PROCESS OF AN APPARATUS AND SELF-SERVICE DEVICE MONITORED ACCORDING TO SAID METHOD

CROSS-REFERENCE TO RELATED APPLICATIONS

This application is entitled to the benefit of and incorporates by reference essential subject matter disclosed in International Patent Application No. PCT/DE99/00157 filed on Jan. 22, 1999 and German Patent Application No. 19806024.6 filed on Feb. 13, 1998.

FIELD OF THE INVENTION

The invention relates to a method for monitoring an equipment operation procedure and to a self-service device monitored using this method. It is based on U.S. Pat. No. 5,594,806.

BACKGROUND OF THE INVENTION

Self-service electronic equipment, in particular machines such as cash dispensers and self-service terminals, are increasingly subject to attacks by unauthorized users aiming to gain unauthorized access to the machine's services. To this end, so-called "front structures" have become known, where, by way of example, a simulation of a card reader mouthpiece is placed in front of a card reader and illegally detains the card. In addition, there have been reports of attempts at covertly observing personal identification numbers, so-called PIN numbers, by fitting a key actuation sensor device over the PIN keypad.

A further problem can be seen in attempts to render equipment of the aforementioned type inoperable as a result of deliberate incorrect operation.

U.S. Pat. No. 5,594,806 relates to a system for identifying persons using the knuckle profile of the fist. The document discloses an arrangement comprising an electronic camera and a data processing unit which processes image information and stores image patterns, said arrangement containing a comparator which is used to compare an image information item supplied by the camera with a stored image pattern and, on the basis of the comparison result, produces a signal which is used to influence the further response of the equipment in which the system is used.

The person identification system is used to scan the knuckle profile of a subject's fist in a recording procedure and to store the measured data which is characteristic only of this person. To this end, the subject needs to grasp a handle and to rotate it into the camera's field of view. This ensures that the fist is forced into a reproducible posture. In a subsequent identification procedure, the handle needs to be grasped in the same way and rotated into the field of view, and the knuckle profile of the fist is then scanned again and the newly obtained measured data is compared with the stored measured data. In this context, the reliability of identification is greater the more exactly the two measured results correspond.

U.S. Pat. No. 5,073,950 discloses a similar system in which the measured data contains the length and a width profile of the subject's fingers. To record these, the subject needs to place his hand on a plate which is illuminated from the back. The hand's shadow contour is scanned using an electronic camera.

Since the placement of the fingers is not the same during the first recording operation and the subsequent, repeated recording operation, a direct comparison between the data would not be meaningful. For this reason, the data is subjected to a method of normalization both during the first recording operation and during the subsequent, repeated recording operation, said normalization method converting the data such that a virtual image with a normalized finger posture is produced, which is the basis for the comparison.

German patent specification DE 196 12 949 C1 has already proposed a virtual input unit which has a user interface which is similar to an input tablet and is formed by a table plate. A video projector projects an image of the key area of a keypad onto the table plate. An electronic camera records the hand, outstretched in a typical pointing position, of a user operating the input device and supplies the image data to a computer. The finger, pointing to a detail of the input device, and its position with respect to the user interface are recognized as such in a pattern recognition method.

U.S. Pat. No. 5,528,263 has also already disclosed the practice of detecting a hand which is using a pointer to point to an input field.

The known arrangements are well suited to increasing input keypads' security against vandalism and secret monitoring, firstly because there are no moving parts such as key buttons, which could be obstructed. Secondly, a front structure on a planar projection surface would be immediately conspicuous. However, the known arrangements are not suitable for securing the entire equipment operation procedure f or an item of self-service equipment.

The object of the invention is to propose a method for monitoring an equipment operation procedure and also a self-service device monitored using this method.

SUMMARY OF THE INVENTION

An optical pattern recognition method is used to detect the hand posture which is characteristic of the respective equipment operation procedure alone or else together with an object to be handled when using equipment, and also its direction of movement, and to compare said hand posture with a prescribed pattern, and a signal influencing the further response of the equipment is produced on the basis of the comparison result.

This makes it possible to ascertain, even before an operating step, whether the hand posture typical of said operating step has been adopted. By way of example, the hand of a person about to insert an identification card or credit card into a card reader has a different posture than a hand which is about to grasp a bundle of bank notes supplied by a cash machine. In the first case, the hand will additionally be holding an identification card or credit card. An empty hand or a hand holding an object which has a different format than the identification card format is recognized as such. A signal representing a negative comparison result is then produced and can be used, for example, to place, or else just not remove, a block in the card reader's card insertion opening.

A hand preparing to grasp a bundle of bank notes is expected to have a typical grasping posture. Furthermore, this hand will be empty. If anything else is detected, the cash withdrawal compartment can be closed in time or else just not opened, or a bundle of bank notes which has been presented can be retracted.

A hand approaching a deposit box will generally be holding an object which is to be deposited and will adopt a posture which allows the object to be inserted into the insertion opening. Security against unacceptable objects can be increased further by providing an envelope beforehand, into which the object to be deposited needs to be placed. Such an envelope can then easily be recognized again.

In a telephone box, a hand reaching f or the handset or holding it can likewise be recognized by its typical posture.

If the equipment operation procedure comprises at least two operating steps each having a characteristic hand posture, a subsequent operating step following one operating step is not enabled until the comparison result for the one operating step is positive, that is to say a signal representing a positive comparison result is output.

If the comparison result is negative, that is to say there is a signal representing a negative comparison result, an audible and/or visual operating tip is given and/or an error message signal is produced which triggers an alarm and/or turns on a camera which portrays the person causing the negative comparison result.

The degree of correspondence between the prescribed pattern and the detected pattern, which degree of correspondence is necessary for the output of a signal reporting a positive comparison result, can preferably be preselected. This allows the tolerance range of the pattern recognition method used to be adjusted to a sharper or less critical setting depending on the equipment operation procedure which is to be monitored.

BRIEF DESCRIPTION OF THE DRAWINGS

Further features and advantages of the invention will emerge from the description below which uses an illustrative embodiment to explain the invention in conjunction with the appended drawings, in which.

DETAILED DESCRIPTION OF THE PREFERRED EMBODIMENTS

Figure 1:
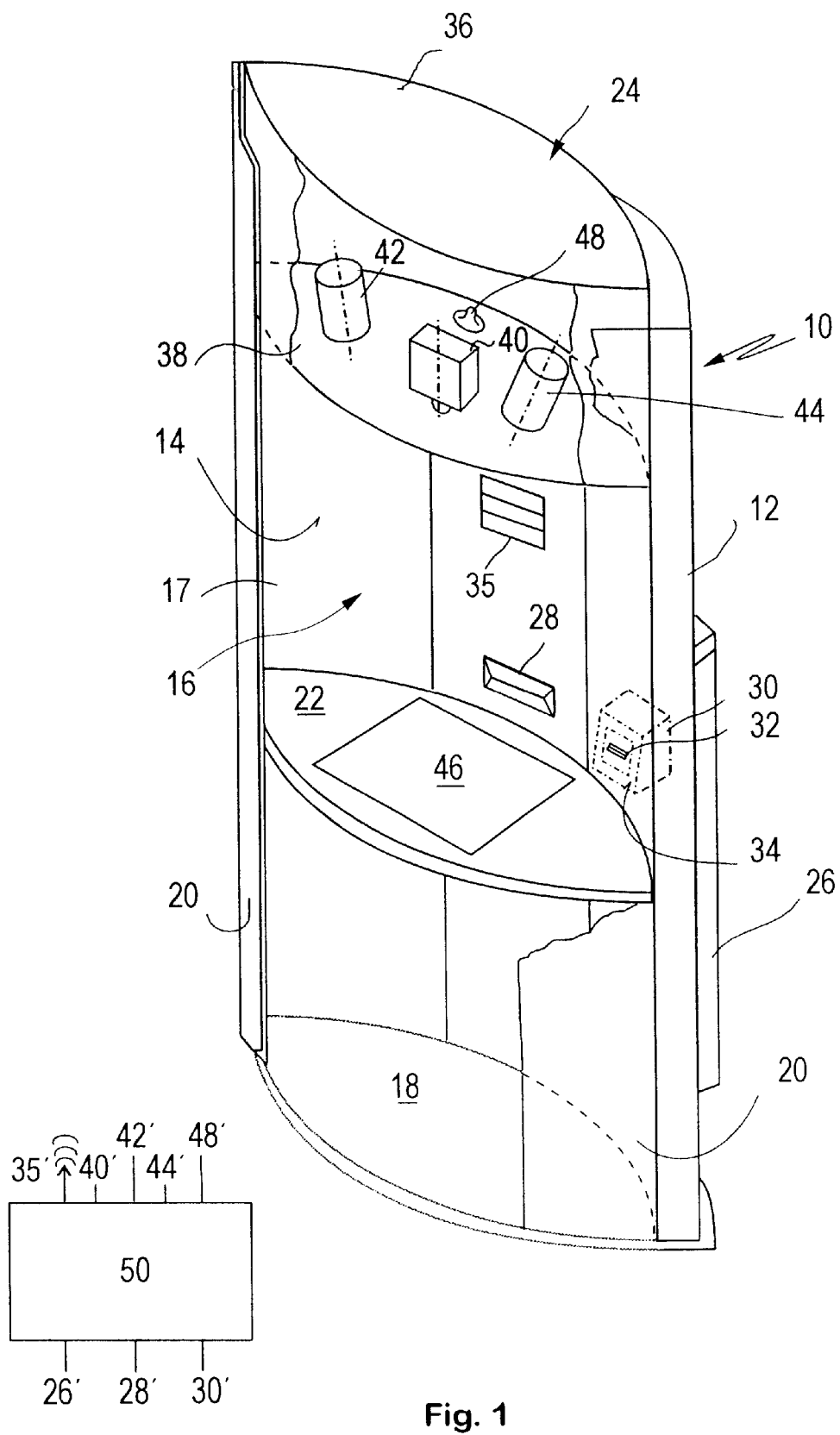
FIG. 1 shows a perspective front view of an item of self-service equipment.

In FIG. 1, an item of self-service equipment is denoted generally by 10.

An essential element of the design is an upright wall element 12 which is hollow on the inside and has an arcuate cross-sectional profile. The concave face 14 of the wall element 12 is the service side 16 of the self-service equipment 10. The wall element 12 is erected on a baseplate 18. Fitted on the side of the wall element 12 are concealing panels 20. A plate 22 is arranged above the baseplate 18 and parallel to it roughly at standard table height. The self-service equipment 10 is closed off at the top by a headpiece 24 whose design will be explained in more detail further below.

Fitted to the back of the wall element 12 is a cash machine 26 whose cash compartment 28 penetrates the wall element 12 above the plate 22 and can thus be accessed from the service side 16. Cash machines and cash compartment shutters are known generally and are therefore not described in more detail. Next to the cash compartment 28, the wall element 12 incorporates a card reader 30 which can either be in the form of an insertion reader with a card insertion opening 32 or in the form of a contactless reader with an induction f ace 34. Arranged above the cash compartment 28 in the wall element 12 is a further compartment 35, which is closed by a transparent cover. Arranged behind this cover is a video camera (not shown) and a proximity sensor 35'. That section of the wall element 12 which is arranged above the plate 22 forms the operating area 17 of the self-service equipment 10.

The headpiece 24 is designed as a hollow body having a cover plate 36 and a bottom bounding wall 38 parallel therewith. Inside the headpiece 24, an electronic camera 40, a video projector 42 and an illumination device 44 are positioned on the bounding wall 38 such that the camera 40 is able to cover the space above the plate 22, the video projector 42 is able to produce a sharp depiction of an image, for example the key area of a keypad, on a projection surface 46 on the plate 22, and the illumination device 44 uniformly illuminates the space above the plate 22. In addition, the bottom bounding wall 38 incorporates a loudspeaker 48 which outputs sound to the area between the wall element 12 and the concealing panels 20.

The self-service equipment 10 is controlled by a data processing unit 50 (shown only symbolically) which is incorporated in the wall element 12 and is shown outside the self-service equipment 10 in FIG. 1, merely for reasons of clarity. The data associated processing unit 50 has the proximity sensor 35', connected to it and has the camera 40 connected to it by means of a connecting line 40', the video projector 42 connected to it by means of a connecting line 42', the illumination device 44 connected to it by means of a connecting line 44' and the loudspeaker 48 connected to it by means of a connecting line 48'. The cash machine 26 is likewise controlled by the data processing unit 50 via a control line 26'. The cash compartment 28 is controlled via a control line 28' and the card reader 30 is connected to the data processing unit 50 by means of a control line 30'. The data processing unit 50 is also used to operate a program for carrying out the aforementioned pattern recognition method.

The way in which the self-service equipment 10 operates is described below. When a person approaches the self-service equipment 10, the proximity sensor 35' responds and the video projector 42, under the control of the data processing unit 50, then projects an operating instruction onto the projection surface 46, said operating instruction containing, amongst other things, an instruction to use an identification card or credit card. At the same time, the camera 40 and the illumination device 44 are put into operation.

Figure 2:
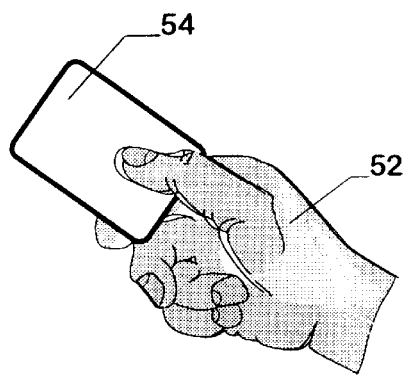
FIGS. 2–6 show characteristic hand postures for various operation procedures.
Figure 3:
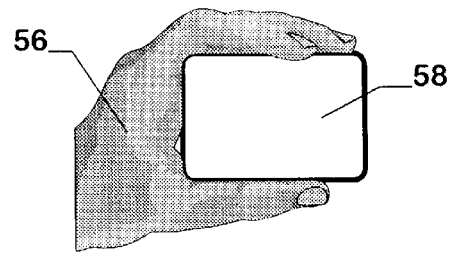

If the card reader 30 is equipped with a card insertion opening 32, the pattern recognition program expects the image of a hand 52 holding an identification card or credit card 54 in the manner shown in FIG. 2. If the camera 40 additionally outputs image signals to the data processing unit 50 which enable a movement of the hand 52 holding the identification card or credit card 54 in the direction of the card insertion opening 32 to be detected, said card insertion opening is unblocked so that the identification card or credit card 54 can be inserted into the card reader 30. If, on the other hand, the card reader 30 is equipped with an induction face 34, the pattern recognition program expects the image of a hand 56 passing an identification card or credit card 58 over the induction face 34 in the hand posture shown in FIG. 3.

Figure 4:
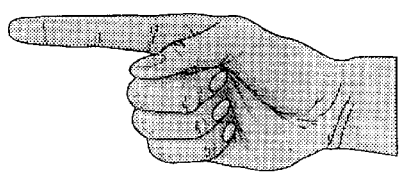
Figure 5:
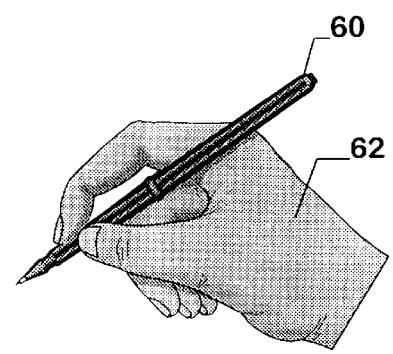

If the expected pattern has been recognized, the data processing unit 50 is changed over from the "monitoring an equipment operation procedure" mode of operation to the "virtual input" mode of operation and the next operating step is started. In this operating step, the key area of a keypad is depicted on the projection surface 46. In the case of the cash machine chosen as the illustrative embodiment of an item of self-service equipment 10, this key area may comprise selection keys for various equipment functions, such as 'withdrawal', 'payment' or 'print statement'. In this case, a hand posture as shown in FIG. 4 is expected. In addition or as an alternative to this, "key actuation" using a pen 60 held by a hand 62 in a hand posture which is characteristic thereof, as shown in FIG. 5, may also be permissible. A recognition method for key entries is described in detail in DE 196 12 949 C1.

Figure 6:
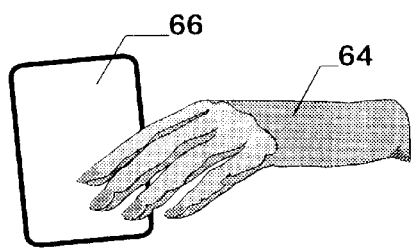

For the next operating step, assuming that the 'payment' equipment function has been selected, the data processing unit 50 is again changed over from the "virtual input" mode of operation to the "monitoring an equipment operation procedure" mode of operation. In this case, the image of a hand 64 holding an envelope 66 as shown in FIG. 6 is expected. If the camera 40 also outputs image signals to the data processing unit 50 which enable a movement of the hand 64 holding the envelope 66 in the direction of the cash compartment 28 to be detected, the cash compartment is unblocked, so that the envelope 66 can be inserted into the cash compartment 28. If the 'withdrawal' equipment function is selected, where a bank note or a bundle of bank notes is provided in the cash compartment 28, the hand posture shown in FIG. 6 is likewise expected. In this case, the hand 64 must be empty, however.

If one of the aforementioned operating steps or a keypad entry has not been detected, the data processing unit 50 produces a signal which represents a negative comparison result and which, by way of example, puts the video camera arranged in the further compartment 35 into operation, said video camera portraying the equipment user. As an alternative or in addition to this, the next operating step can be disabled. It is also possible to distinguish between various types of incorrect operation: in the case of operating errors which do not suggest a malicious attack on the self-service equipment 10, the equipment user can, by way of example, be requested to repeat the last operating step by an audible information item output over the loudspeaker 48. A detailed operating instruction may also be projected onto the projection surface 46.

The invention is not restricted to cash machines. Instead, it can be used in equipment of any type whose operation requires characteristic hand postures. Self-service equipment in the context of the invention, for example, may also be goods or services machines, telephone boxes with a payphone or else, in addition, fax or e-mail access, and luggage or mail safety deposit box systems.

What is claimed is:

1. A self-service device the operation of which is monitored using an optical pattern recognition method that detects hand posture characteristic of a particular operation procedure and compares the hand posture with a prescribed pattern the response of the self-service device being governed by the results of the comparison, the self-service device comprising; an electronic camera and a data processing unit which processes image information and stores image patterns, and which contains a comparator which is used to compare an image information item supplied by the camera with a stored image pattern and produces a signal influencing the further response of the equipment on the basis of the comparison result, the patterns stored in the data processing unit correspond to hand posture which is characteristic of a first or else of at least one further equipment operation procedure alone or else together with an object to be handled when using the equipment, in that the data processing unit the position of a hand assuming the hand posture which is characteristic of the respective equipment operation procedure alone or else together with the object to be handled when using equipment, and in that the comparator compares a movement sequence for the hand, recorded by the camera, with the stored hand position.

2. The self-service device as claimed in claim 1, characterized in that the camera, an illumination device and a video projector are arranged in a headpiece closing off an operating area at the top.

3. The self-service device as claimed in claim 2, characterized in that the operating area is bounded at the bottom by a plate comprising a projection surface.

* * * * *